United States Patent [19]

Luchessa et al.

[11] 4,422,328
[45] Dec. 27, 1983

[54] LIQUID LEVEL SENSOR

[75] Inventors: Charles E. Luchessa, San Rafael; Timothy E. Brown, Danville, both of Calif.

[73] Assignee: Sierra Misco, Berkeley, Calif.

[21] Appl. No.: 310,792

[22] Filed: Oct. 13, 1981

[51] Int. Cl.³ ............................................. G01F 23/12
[52] U.S. Cl. ......................................... 73/313; 73/321; 73/DIG. 5; 335/206; 335/207
[58] Field of Search ................... 73/313, 321, DIG. 5; 335/206, 207, 205; 200/84 C, 61.2

[56] References Cited

U.S. PATENT DOCUMENTS

| | | | |
|---|---|---|---|
| 2,627,178 | 2/1953 | Hayward et al. | 73/313 X |
| 3,148,542 | 9/1964 | Clift, Jr. | 73/313 |
| 3,441,691 | 4/1969 | Newman et al. | 335/206 X |
| 3,463,491 | 8/1969 | Shaw | 335/206 X |
| 3,729,667 | 4/1973 | Taylor | 73/313 X |
| 3,835,335 | 9/1974 | Robischon | 73/313 X |
| 3,935,741 | 2/1976 | Zinsmeyer et al. | 73/313 |
| 4,061,901 | 12/1977 | Saunders et al. | 73/313 X |

FOREIGN PATENT DOCUMENTS

| | | | |
|---|---|---|---|
| 639339 | 6/1950 | United Kingdom | 73/313 |
| 393774 | 12/1973 | U.S.S.R. | 335/206 |
| 662812 | 5/1979 | U.S.S.R. | 73/321 |

Primary Examiner—S. Clement Swisher
Assistant Examiner—Tom Noland
Attorney, Agent, or Firm—Julian Caplan

[57] ABSTRACT

The device senses the level of a float which may rest on the surface of the liquid whose level is to be determined or may rest on the surface of liquid (e.g., mercury) of a manometer which measures the level of liquid in accordance with the purge bubble principle. The fluctuation of the float turns a pulley which causes oscillatory movement of an arm carrying a magnet. In proximity to the path of the magnet is a board carrying radially disposed, angularly spaced reed switches. As the magnet passes each switch it closes same and passes a signal to a digital accumulator. A slip clutch between the arm and a second arm causes the latter to oscillate in the same direction as the first arm, but only for a limited distance. The second arm also carries a magnet which changes the direction of a second reed switch and dampens hunting of the first series of switches by preventing activation of the accumulator except when the second reed switch is closed.

7 Claims, 6 Drawing Figures

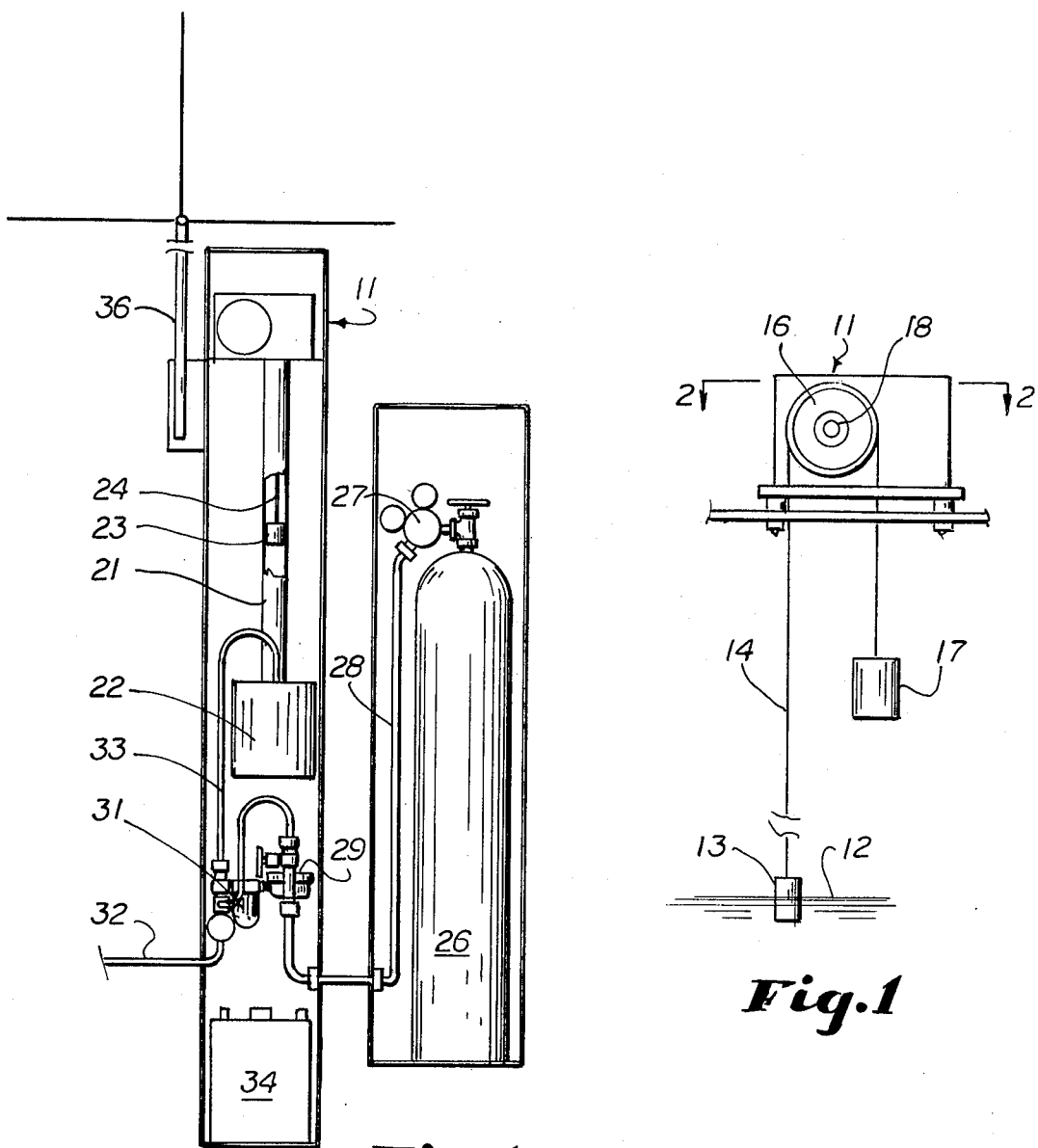
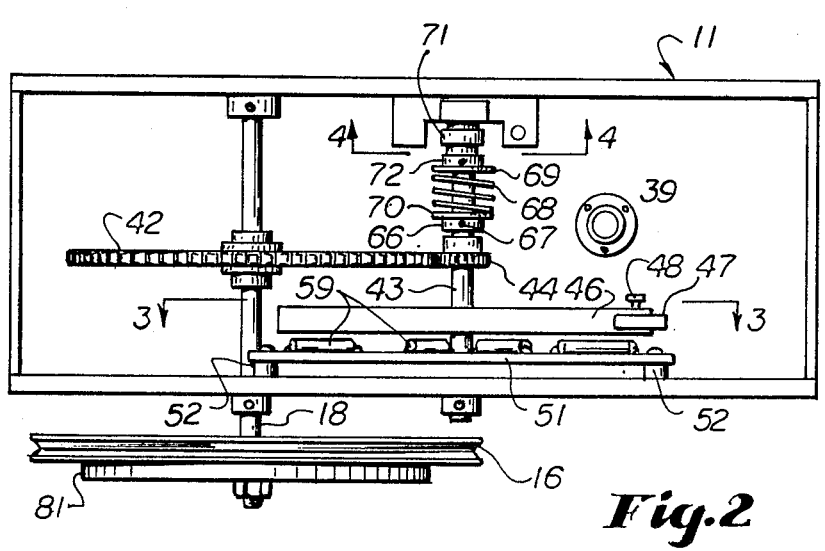

LIQUID LEVEL SENSOR

This invention relates to a new and improved liquid level sensor for use in remote areas, giving a read-out of the position of a float in a body of water or other liquid.

More particularly, the preferred embodiment of the invention provides a digital read-out of slight increments and decrements of a liquid level float. Such a float may rest upon the body of water or other liquid whose depth is being measured, or on the surface of liquid (e.g., mercury) in a manometer.

The present invention has particular utility where radio transmission of liquid depth is used to transmit the data obtained by the present invention, such radio transmission being particularly desirable where the site is remote and difficult of access.

A feature of the invention is the fact that the sensitivity of the instrument may be changed in various manners, such as by changing the angular spacing between the reed switches hereinafter described, or by changing the pulley ratios or gear ratios also hereinafter described.

A still further feature of the invention is that the device is not sensitive to hunting or flutter. The sensitivity is subject to adjustment.

Another feature of the invention is the fact that, in addition to giving an electronic digital read-out, the device may also be used with a mechanical read-out which shows the depth at any particular time.

The device hereinafter described is durable, weatherproof and maintenance free.

Other objects of the present invention will become apparent upon reading the following specification and referring to the accompanying drawings in which similar characters of reference represent corresponding parts in each of the several views.

In the drawings:

FIG. 1 is a schematic view showing the device installed to read the position of a float on a body of water;

FIG. 1A is a schematic view similar to FIG. 1 showing the device reading the level of a manometer used in the "purge bubble" system for reading liquid depth;

FIG. 2 is an enlarged sectional view taken substantially along the line 2—2 of FIG. 1;

Figure 3:
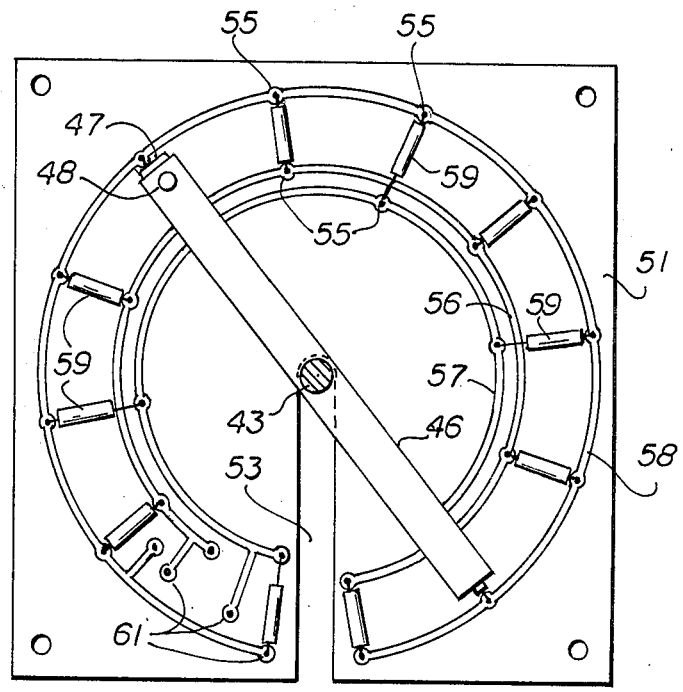
FIG. 3 is a vertical sectional view taken substantially along the line 3—3 of FIG. 2.
Figure 4:
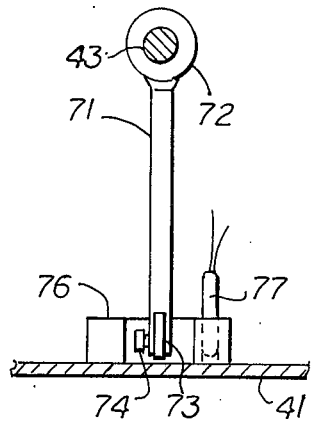
FIG. 4 is a vertical sectional view taken substantially along the line 4—4 for FIG. 2.

FIG. 1 shows a typical installation in which the instrument 11 of the present invention is used to measure the level of the surface 12 of a body of water or other liquid. Float 13 on surface 12 is attached to a ball-link or other chain 14 or cable passing around a pulley 16 on the instrument, the chain 14 having a counterweight 17 on the opposite end thereof.

FIG. 1A shows an alternate installation. Manometer 21 is connected to a reservoir 22 of liquid, usually mercury. Float 23 rests on the surface of the manometer 21 and is connected by a chain 24 similar to the chain 14 and also carries a counterweight (not shown). The installation of FIG. 1A uses the purge bubble principle. Thus, a tank 26 of a compressed gas such as nitrogen dispenses through a regulator 27 to a line 28 leading to a low pressure regulator 29 and thence through a bubble gauge 31. From the gauge 31 a purge bubble line 32 leads to the bottom of a lake or other body of water to be tested. Also leading from the regulator 31 is a line 33 which opens into the upper end of the reservoir 22. The regulators 27 and 29 are so adjusted that a regular, but spaced, series of bubbles passes through the gauge 31. This steady, but slight, flow of gas passes through the line 32 and out the lower end thereof causing a series of bubbles to be emitted which rise to the surface of the water being measured. The pressure in the line 33 is proportional to the depth of the water being measured, all in accordance with the well-known purge bubble principle. It will be noted that this pressure is transmitted by the line 33 to the top of the reservoir 22. Preferably, reservoir 22 has a larger diameter than manometer 21, thereby increasing the sensitivity of the rise and fall of the liquid in the manometer 21. Float 23 on the surface of the liquid in manometer 21, rises and falls, depending upon the depth of the body of water being measured. Further referring to FIG. 1A, a radio transmitter 34 having antenna 36 may be used to transmit data by well-known means not hereinafter described or herein illustrated.

Instrument 11 has an enclosed casing 41, which preferably carries on its bottom a bubble level 39 indicating when the instrument casing 41 is properly levelled. Pulley 16 turns horizontal shaft 18 which extends interiorly of casing 41 and carries a gear 42. Parallel to shaft 18 is a countershaft 43 carrying a pinion 44 which meshes with gear 42. By changing the pitch of gears 42 and 44, the sensitivity of the device may be adjusted.

Figure 5:
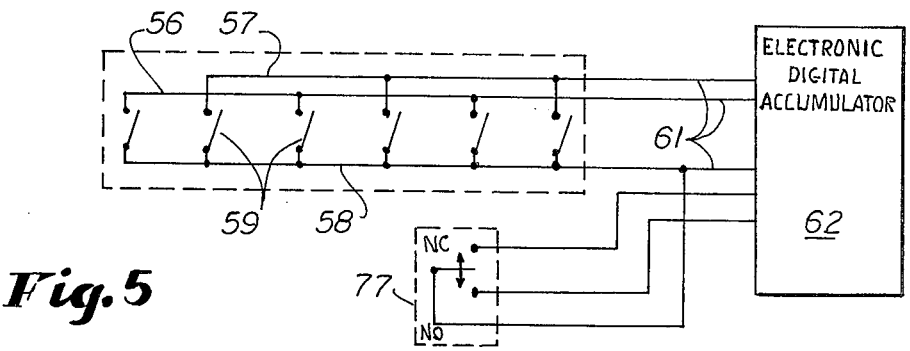
FIG. 5 is a schematic wiring diagram.

Countershaft 43 carries an arm 46 which is bifurcated at one end to receive a permanent magnet 47 adjustably held therein by setscrew 48. Preferably the arm 46 extends to either side of countershaft 43, thereby providing a counterweight so that the effect of gravity on the arm 46 is minimized. In close proximity to the path of magnet 47 is a board 51 secured to the front of casing 41 by supports 52. A slot 53 (FIG. 3) is formed in board 51 so as to permit interchange of the board 51 as required without removing the countershaft 53. Referring particularly to FIGS. 3 and 5, on the board 51 are three concentric conductors, namely, an inner arcuate conductor 57, an intermediate conductor 56 in close proximity to conductor 57 and a spaced outer conductor 58. Reed switches 59 are radially disposed and angularly spaced from each other. Switches 59 interconnect the conductor 58 with either the conductor 56 or 57, adjacent switches being alternately connected to the conductor 56 or 57. For convenience in connecting switches 59 to the conductors, apertured lugs 55 may be located at convenient intervals along conductors 56, 57, 58. The wires of switches 59 are inserted through lugs 55 at some locations (as illustrated) or all locations (not shown—NOTE some lugs 55 may not be connected to switches). This preferred construction improves the sensitivity of the device, although the use of two conductors 56 and 57 is optional. Conductors 61 lead from the terminals of each of the conductors 56, 57 and 58 to an electronic digital accumulator 62. As the magnet 47 passes each switch 59 as countershaft 43 is turned, it momentarily closes each switch 59. A signal is thus transmitted to the accumulator 62. Summation of the signals transmitted to the accumulator 62 gives a reading indicating the depth of the liquid being sensed.

For further sensitivity to reduce hunting or fluttering of the reading of accumulator 62, a preferred means is herein illustrated. Collar 66 is fixed by setscrew 67 to countershaft 43. Coil spring 68 surrounds shaft 43 and bears at one end against washer 70 which bears against collar 66. The opposite end of spring 68 bears against washer 69 which, in turn, bears against collar 72 of arm 71. By adjusting the position of collar 66 along the length of shaft 43, the pressure of washer 69 against collar 72 is adjusted thereby adjusting the sensitivity of the anti-hunting device. Arm 71 at its outer end carries a magnet 73 adjustably held in place by set screw 74. The magnet 73 is confined to a narrow arcuate movement by means of the arms of yoke 76 which is fixed to the bottom of casing 41. One of the arms of yoke 76 carries a double-throw reed switch 77. Referring again to FIG. 5, one of the contacts of switch 77 is normally closed and the other normally open. The signal of the conductor 78 is transmitted to the middle pole of the switch 77. As shaft 43 (and accordingly arm 46) is oscillated, the frictional engagement of washer 69 with collar 72 tends to swing arm 71 in the same direction. Only if the arm 71 swings a sufficient distance to influence reed switch 77 is the signal transmitted to the accumulator 62 effective. Hence, flutterering of the arm 46 prevents inaccurate readings of the accumulator 62.

Optionally, in addition to the read-out heretofore mentioned, a mechanical digital read-out may be obtained by attaching a gear sprocket 81 to shaft 18 and also connecting the same to the mechanical read-out.

What is claimed is:

1. A liquid level sensor comprising a shaft, means for turning said shaft dependent upon the upper surface level of the liquid to be sensed, an arm pivotable about an axis as said shaft turns, a magnet on said arm, a board parallel to the plane of movement of said magnet, a plurality of reed switches on said board disposed radially with respect to said axis and angularly spaced apart so that as said magnet turns said switches are closed one-by-one, and an electric circuit including an electronic digital accumulator and said switches, said accumulator counting the number of times said switches are closed and adding or subtracting from the previous number depending on the direction of rotation of said arm, a countershaft parallel to said first-mentioned shaft and means for turning said countershaft proportional to turning of said first-mentioned shaft, said arm being fixed to said countershaft, first, second and third concentric arcuate conductors on said board, connected into said electric circuit, a first series of switches being connected to the first and second conductors, a second series of said switches being connected to the first and third conductors, switches of said first and second series alternating around said board.

2. A sensor according to claim 1 in which said surface is in a liquid column of a manometer and which further comprises a purge bubble system connected to govern the height of said liquid column and also having a tube extending to a point substantially below the surface of a body of liquid whose height is to be measured, a sprocket on said shaft, a chain about said sprocket, a float resting on said surface of said liquid column on one end of said chain and a counterweight on the opposite end of said chain.

3. A liquid level sensor comprising a shaft, means for turning said shaft dependent upon the level of the liquid to be sensed, an arm pivotable about an axis as said shaft turns, a magnet on said arm, a board parallel to the plane of movement of said magnet, a plurality of reed switches on said board disposed radially with respect to said axis and angularly spaced apart so that as said magnet turns said switches are closed one-by-one, and an electric circuit including an electronic digital accumulator and said switches, said accumulator counting the number of times said switches are closed and adding or subtracting from the previous number depending on the direction of rotation of said arm, a second arm pivotal about said axis, a slip clutch biasing said second arm to pivot in the same direction as said first-mentioned arm through a limited arc of movement, a second magnet on said second arm, and an anti-flutter reed switch, said anti-flutter switch sending a signal to said accumulator only when said second arm has pivoted a distance related to the distances between consecutive first-mentioned switches, whereby flutter of said first-mentioned switches does not affect the count of said accumulator.

4. A sensor according to claim 3 in which said anti-flutter switch is a double throw switch normally closed to a first contact and normally open to a second contact.

5. A sensor according to claim 3 which further comprises means limiting the arcuate movement of said second arm.

6. A sensor according to claim 3 which further comprises a countershaft parallel to said first-mentioned shaft and means for turning said countershaft proportional to turning of said first-mentioned shaft, said slip clutch comprising a first collar fixed to said countershaft, said second arm having a second collar and a coil spring around said countershaft, opposite ends of said spring bearing against said collars.

7. A sensor according to claim 6 in which said first collar is adjustable along said countershaft to adjust the force of said spring controlling the distance said second arm pivots about said countershaft.

* * * * *